United States Patent [19]

Silver et al.

[11] Patent Number: 5,436,451
[45] Date of Patent: Jul. 25, 1995

[54] HIGH-SPEED GAMMA PULSE SUPPRESSION CIRCUIT FOR SEMICONDUCTOR INFRARED DETECTORS

[75] Inventors: Arnold H. Silver; Hugo W.-K. Chan, both of Rancho Palos Verdes, Calif.

[73] Assignee: TRW Inc., Redondo Beach, Calif.

[21] Appl. No.: 19,391

[22] Filed: Feb. 2, 1993

[51] Int. Cl.$^6$ .................... H01L 39/22; H04B 1/10; G01J 5/00
[52] U.S. Cl. .................... 250/336.1; 250/336.2; 250/338.1; 250/338.4
[58] Field of Search .............. 250/336.1, 336.2, 338.1, 250/338.4, 370.01, 370.06, 370.05, 370.04, 390.01; 328/162, 165, 167; 307/306, 245, 542, 520, 543

[56] References Cited

U.S. PATENT DOCUMENTS

| | | | |
|---|---|---|---|
| 3,783,387 | 1/1974 | Wernli | 455/212 |
| 3,980,964 | 9/1976 | Grodinsky | 330/278 |
| 4,204,164 | 5/1980 | Kage | 455/135 |
| 4,743,762 | 5/1988 | Gaalema et al. | 250/370.08 X |
| 4,920,548 | 4/1990 | Gaussa, Jr. et al. | 250/336.1 X |
| 4,931,743 | 6/1990 | Fukuda et al. | 328/167 |
| 5,136,352 | 8/1992 | McIver | 250/370.06 X |
| 5,198,710 | 3/1993 | Houston | 307/520 |
| 5,227,732 | 7/1993 | Hong | 307/543 X |

*Primary Examiner*—Constantine Hannaher
*Assistant Examiner*—Edward J. Glick

[57] ABSTRACT

A high-speed gamma pulse suppression circuit employing a frequency discrimination and sampling technique for elimination of gamma induced noise from semiconductor infrared detectors. The gamma pulse suppression circuit includes a high pass filter for separating high-frequency gamma induced pulses from a detector signal and a gamma pulse detector for detecting the gamma induced pulses. The gamma pulse suppression circuit is connected in parallel with a detector readout circuit such that the suppression circuit causes the readout circuit to discard samples of the detector signal in which gamma induced pulses are detected. The gamma pulse suppression circuit provides effective and efficient real time gamma pulse suppression by completely eliminating the detected gamma pulses from the detector signal, while preserving the quality of the signal.

8 Claims, 3 Drawing Sheets

HIGH-SPEED GAMMA PULSE SUPPRESSION CIRCUIT FOR SEMICONDUCTOR INFRARED DETECTORS

This application is related to an application by Arnold H. Silver et al. entitled "Monolithically-Integrated Semiconductor/Superconductor Infrared Detector and Readout Amplifier," which was filed on Nov. 4, 1992.

BACKGROUND OF THE INVENTION

This invention relates generally to semiconductor infrared detectors and, more particularly, to techniques for suppressing gamma induced noise in semiconductor infrared detectors.

Semiconductor infrared detectors are commonly arranged in focal plane arrays and cryogenically cooled to very low temperatures to provide sensitive detection of infrared radiation for various types of space-based infrared sensor systems. Cooling these infrared detector arrays to very low temperatures is particularly important for highly sensitive detection of infrared radiation in the longer wavelength, or far infrared, portion of the spectrum, especially under low background conditions. However, low-temperature infrared detector arrays generate very small analog signals which are easily contaminated by noise, such as noise induced by high-energy gamma rays.

Gamma induced noise is a particular problem for space-based infrared sensor systems because the infrared detectors are continuously exposed to gamma ray emissions from the sun. These gamma emissions are filtered out by the earth's atmosphere and do not pose a problem for earth-based infrared sensor systems. However, both space-based and earth-based infrared sensor systems are susceptible to heavy gamma ray emissions from nuclear explosions.

Gamma ray emissions cause secondary or Compton electron generation within the infrared detector and neighboring semiconductor material, producing noise in the form of electrical pulses. These gamma induced pulses can severely degrade the detection capabilities of the infrared detector, and even cause total blindness in the case of nuclear explosions. Consequently, gamma pulse suppression is required in order to preserve highly sensitive detection of infrared radiation in a gamma ray environment.

One technique for suppressing gamma induced noise is pulse amplitude discrimination, which employs limited oversampling and extensive digital filtering to reduce the peak amplitude excursions of the detector signal. However, pulse amplitude discrimination does not completely eliminate gamma induced pulses from the detector signal, and it degrades the quality of the signal. Accordingly, there has been a need for an improved gamma suppression technique for semiconductor infrared detectors. The present invention is directed to this end.

SUMMARY OF THE INVENTION

The present invention resides in a high-speed gamma pulse suppression circuit employing a frequency discrimination and sampling technique for elimination of gamma induced noise from semiconductor infrared detectors. The gamma pulse suppression circuit includes a high pass filter for separating high-frequency gamma induced pulses from a detector signal and a gamma pulse detector for detecting the gamma induced pulses. The gamma pulse suppression circuit is connected in parallel with a detector readout circuit such that the suppression circuit causes the readout circuit to discard samples of the detector signal in which gamma induced pulses are detected. The gamma pulse suppression circuit provides effective and efficient real time gamma pulse suppression by completely eliminating the detected gamma pulses from the detector signal, while preserving the quality of the signal.

In a preferred embodiment of the present invention, the gamma pulse suppression circuit includes a shunt capacitor and a semiconductor/superconductor gamma pulse detector. The detector readout circuit includes a semiconductor/superconductor transimpedance readout amplifier and an oversampling superconducting analog-to-digital (A/D) converter. When one or more gamma induced pulses are detected by the gamma pulse detector during a sampling interval, the A/D converter is interrupted, causing it to discard the digitized sample of the detector signal in which the gamma induced pulses are detected.

The gamma pulse detector includes a semiconductor barrier diode, a thin-base superconducting Josephson tunnel junction, and a superconducting quantum interference device (SQUID) latch. The shunt capacitor and the resistance of the barrier diode form an RC high pass filter which separates the high-frequency gamma induced pulses from the detector signal for detection by the gamma pulse detector. The barrier diode and Josephson junction form a high-gain, high-input-impedance amplifier which provides the high-speed gamma pulse detection.

The gamma pulse detector operates in either a current switching mode or an amplification mode, the amplification mode being used when additional gain is required. In the current switching mode, the thin-base Josephson junction is biased in the zero voltage state just below its critical current and the SQUID latch is not used. A gamma induced pulse reduces the critical current of the Josephson junction below its bias current, causing the Josephson junction to jump from the zero voltage state into the voltage state and latch to its sumgap voltage. The sumgap voltage is applied to the A/D converter, which interrupts the A/D converter and causes it to discard the digitized sample of the detector signal in which the gamma induced pulses are detected.

In the amplification mode, the thin-base Josephson junction is biased at its sumgap voltage by a load and the SQUID latch is biased in the zero voltage state just below its critical current. A gamma induced pulse causes a shift in the I-V curve of the Josephson junction such that the curve intersects the junction load line at higher current levels, thus providing amplification of the gamma pulse. The amplified gamma pulse reduces the critical current of the SQUID latch below its bias current, causing the SQUID latch to jump from the zero voltage state into the voltage state and latch to its sumgap voltage. The sumgap voltage is applied to the A/D converter, which interrupts the A/D converter and causes it to discard the digitized sample of the detector signal in which the gamma induced pulses are detected. In either mode, the barrier diode and thin-base Josephson junction provide a high-speed gamma pulse detector which responds to gamma induced pulses at nanosecond speeds.

It will be appreciated from the foregoing that the present invention represents a significant advance in the field of gamma pulse suppression. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

Figure 1:
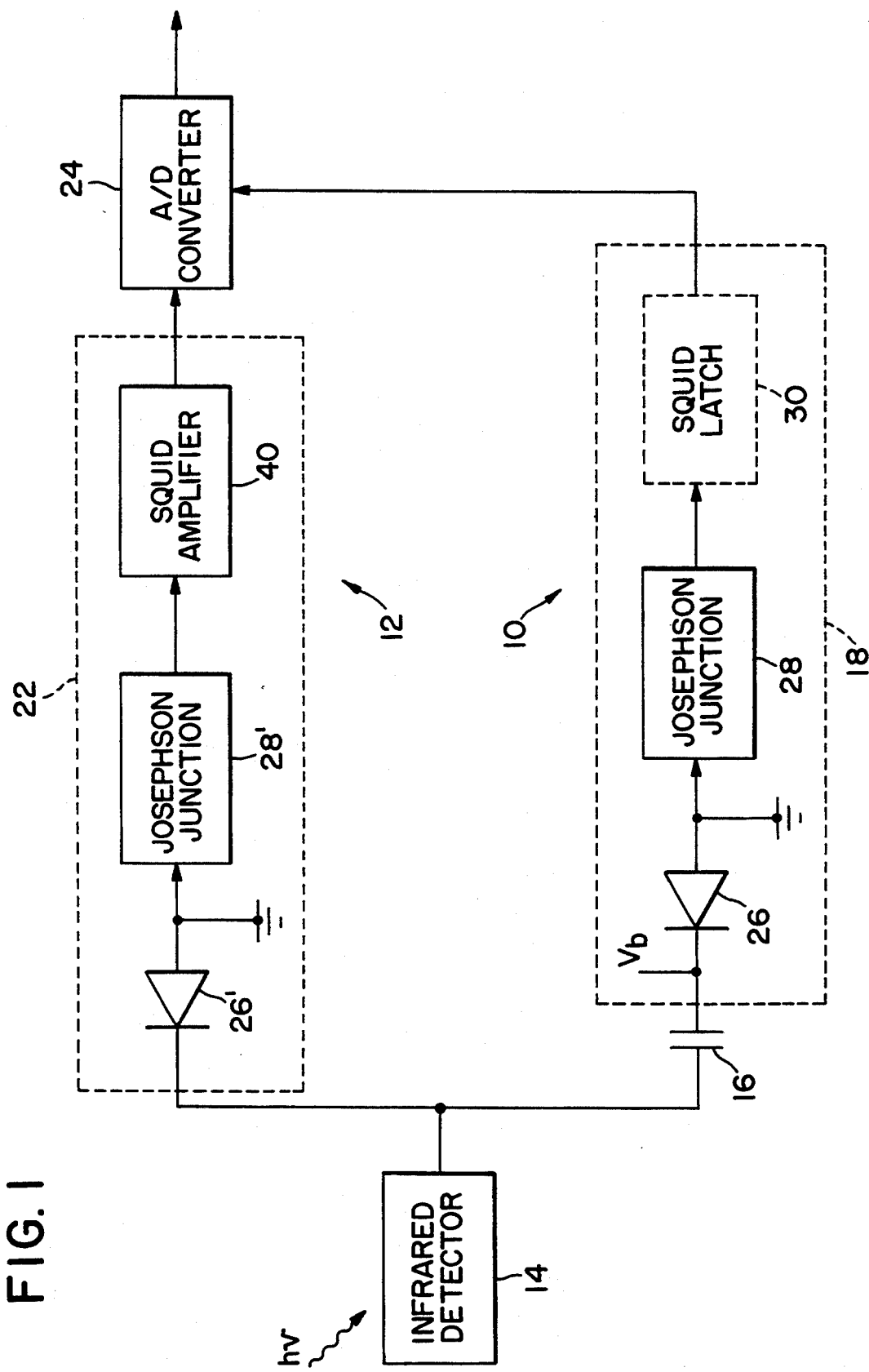
FIG. 1 is circuit diagram of a high-speed gamma pulse suppression circuit in accordance with the present invention.

As shown in the drawings for purposes of illustration, the present invention is embodied in a high-speed gamma pulse suppression circuit employing a frequency discrimination and sampling technique for elimination of gamma induced noise from semiconductor infrared detectors. The gamma pulse suppression circuit includes a high pass filter for separating high-frequency gamma induced pulses from a detector signal and a gamma pulse detector for detecting the gamma induced pulses. The gamma pulse suppression circuit is connected in parallel with a detector readout circuit such that the suppression circuit causes the readout circuit to discard samples of the detector signal in which gamma induced pulses are detected. The gamma pulse suppression circuit provides effective and efficient real time gamma pulse suppression by completely eliminating the detected gamma pulses from the detector signal, while preserving the quality of the signal.

As shown in FIG. 1, a gamma pulse suppression circuit 10 is connected in parallel with a detector readout circuit 12 to eliminate gamma induced noise from the output signal of a semiconductor infrared detector 14. The gamma pulse suppression circuit 10 includes a shunt capacitor 16 and a semiconductor/superconductor gamma pulse detector 18. The detector readout circuit 12 includes a semiconductor/superconductor transimpedance readout amplifier 22 and an oversampling superconducting analog-to-digital (A/D) converter 24. When one or more gamma induced pulses are detected by the gamma pulse detector 18 during a sampling interval, the A/D converter 24 is interrupted, causing it to discard the digitized sample of the detector signal in which the gamma induced pulses are detected.

Figure 2:
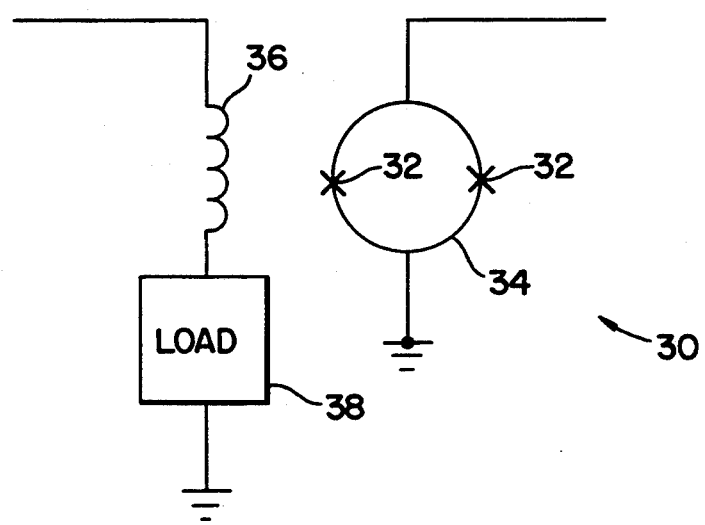
FIG. 2 is a circuit diagram of a superconducting quantum interference device (SQUID) latch for use in the gamma pulse suppression circuit.

The gamma pulse detector 18 includes a semiconductor barrier diode 26, a thin-base superconducting Josephson tunnel junction 28, and a superconducting quantum interference device (SQUID) latch 30. The shunt capacitor 16 and the resistance of the barrier diode 26 form an RC high pass filter which separates the high-frequency gamma induced pulses from the detector signal for detection by the gamma pulse detector 18. The barrier diode 26 and Josephson junction 28 form a high-gain, high-input-impedance amplifier which provides the high-speed gamma pulse detection. As shown in FIG. 2, the SQUID latch 30 includes a pair of superconducting Josephson tunnel junctions 32 connected in a superconducting loop 34. The thin-base Josephson junction 28 is inductively coupled to the SQUID latch 30 by an inductor coil 36 and load 38.

Figure 3:
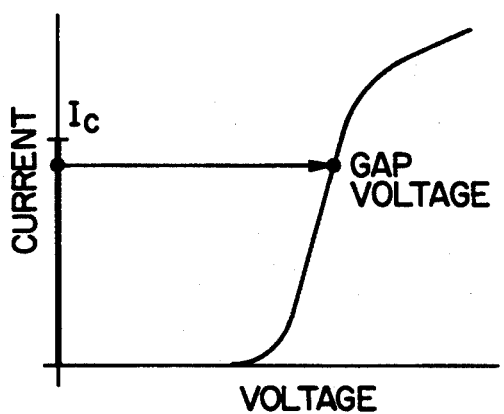
FIG. 3 is an I-V curve of a thin-base superconducting Josephson tunnel junction biased for the current switching mode and an I-V curve of the SQUID latch biased for the amplification mode.

The gamma pulse detector 18 operates in either a current switching mode or an amplification mode, the amplification mode being used when additional gain is required. In the current switching mode, the thin-base Josephson junction 28 is biased in the zero voltage state just below its critical current ($I_c$), as shown in FIG. 3, and the SQUID latch 30 is not used. A gamma induced pulse reduces the critical current ($I_c$) of the Josephson junction 28 below its bias current, causing the Josephson junction to jump from the zero voltage state into the voltage state and latch to its sumgap voltage. The sumgap voltage is applied to the A/D converter 24, which interrupts the A/D converter and causes it to discard the digitized sample of the detector signal in which the gamma induced pulses are detected.

Figure 4:
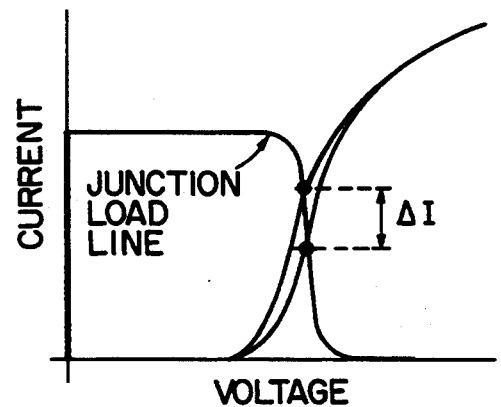
FIG. 4 is an I-V curve of the thin-base Josephson junction biased for the amplification mode.

In the amplification mode, the thin-base Josephson junction 28 is biased at its sumgap voltage by the load 38, as shown in FIG. 4, and the SQUID latch 30 is biased in the zero voltage state just below its critical current ($I_c$), as shown in FIG. 3. A gamma induced pulse causes a shift in the I-V curve of the Josephson junction such that the curve intersects the junction load line at higher current levels ($\Delta I$), as shown in FIG. 4, thus providing amplification of the gamma pulse. The amplified gamma pulse reduces the critical current ($I_c$) of the SQUID latch 30 below its bias current, causing the SQUID latch to jump from the zero voltage state into the voltage state and latch to its sumgap voltage, as shown in FIG. 3. The sumgap voltage is applied to the A/D converter 24, which interrupts the A/D converter and causes it to discard the digitized sample of the detector signal in which the gamma induced pulses are detected. In either mode, the barrier diode 26 and thin-base Josephson junction 28 provide a high-speed gamma pulse detector which responds to gamma induced pulses at nanosecond speeds.

The transmimpedance readout amplifier 22 includes a semiconductor barrier diode 26', a thin-base superconducting Josephson tunnel junction 28', and a high-gain SQUID amplifier 40. The barrier diode 26'; and Josephson junction 28' form a high-gain, high-input-impedance first stage amplifier. The SQUID amplifier 40 is a second stage amplifier which generates a single flux quantum (SFQ) pulse train with a frequency that is proportional to the amplified voltage. The superconducting A/D converter 24 then digitally counts these pulses.

Each barrier diode 26, 26' generates hot electrons in response to its input signal. These hot electrons are injected into the thin base electrode of the Josephson junction 28, 28' causing a change in the Cooper pair/quasiparticle balance of the electrode. The hot electrons are injected over the barrier at energy levels up to one half of an electron volt (500 meV), compared with several millielectron volts (2.5 meV for Nb and 4.5 meV for NbN) for the Cooper pair binding energy. Therefore, the hot electrons have energy levels that are much greater than the Cooper pair binding energy and each injected electron breaks up hundreds of Cooper pairs into quasiparticles. A change in the Cooper pair and quasiparticle densities is reflected in a change in the effective temperature of the electron gas and a corresponding change in the occupancy of the quasiparticle states in the Josephson junction. The result is a decrease in the measured sumgap voltage of the Josephson junction and an increase in the quasiparticle tunneling current.

Each semiconductor barrier diode 26, 26' is preferably a Schottky barrier diode, a metal-insulator-semiconductor (MIS) barrier diode, a metal-insulator-metal (MIM) barrier diode, or a metal-lightly doped semiconductor-doped semiconductor (MOTT) barrier diode. The barrier diode 26 in the gamma pulse detector 18 is biased ($V_b$) at or close to its turn on potential, which is typically less than 1 V. The thickness of the thin base electrode of each Josephson junction 28, 28' is preferably on the order of 0.015 microns. A following Josephson junction can be used in place of the SQUID latch 30. The load 38 is preferably a resistor or a second superconducting Josephson tunnel junction having the same I-V characteristics as the thin-base Josephson junction 28.

Figure 5:
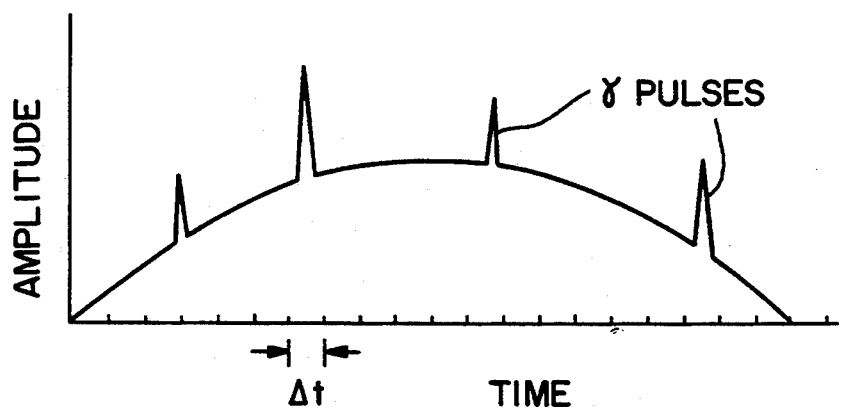
FIG. 5 is a graph of detector signal amplitude as a function of time for an infrared target moving across the field-of-view (FOV) of an infrared detector element.
Figure 6:
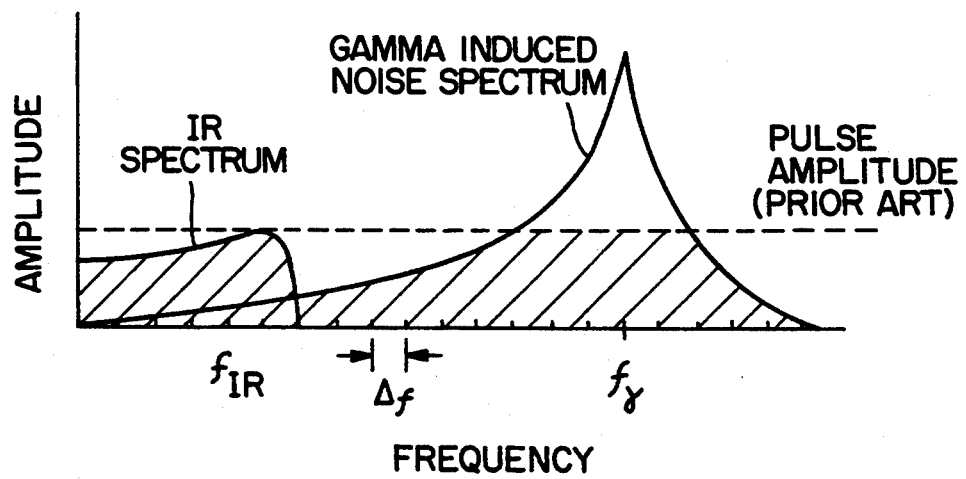
FIG. 6 is a graph of detector signal amplitude as a function of frequency comparing the frequency discrimination and sampling technique of the present invention with the pulse amplitude discrimination technique of the prior art.

FIG. 5 is a graph of detector signal amplitude as a function of time ($\Delta t$=sampling interval) for an infrared target moving across the field-of-view (FOV) of the infrared detector 14. Several gamma induced pulses are shown. FIG. 6 is a graph of detector signal amplitude as a function of frequency ($\Delta f = 1/\Delta t$) comparing the frequency discrimination and sampling technique of the present invention with the pulse amplitude discrimination technique of the prior art. The pulse amplitude discrimination technique uses limited oversampling and extensive digital filtering to reduce the peak amplitude excursions of the detector signal. However, as shown by the graph, pulse amplitude discrimination does not completely eliminate the gamma induced noise spectrum from the detector signal, and it degrades the quality of the signal. In contrast, the frequency discrimination and sampling technique of the present invention provides effective and efficient real time gamma pulse suppression by completely eliminating the detected gamma induced noise spectrum from the detector signal, while preserving the quality of the signal.

The gamma pulse suppression circuit 10 and the detector readout circuit 12 use superconducting electronics to provide low power consumption and a wide bandwidth. These superconducting electronics, which can be fabricated from niobium (Nb), niobium nitride (NbN), or high temperature superconducting materials, allow the suppression circuit and the detector readout circuit to be monolithically integrated with existing high performance infrared focal plane detectors. Although the gamma pulse suppression circuit has been described with reference to semiconductor infrared detectors, the suppression circuit can be used with other types of detectors, such as microwave and optical detectors, and with any other type of device that operates in a gamma ray environment.

From the foregoing, it will be appreciated that the present invention represents a significant advance in the field of gamma pulse suppression. Although several preferred embodiments of the invention have been shown and described, it will be apparent that other adaptations and modifications can be made without departing from the spirit and scope of the invention. Accordingly, the invention is not to be limited, except as by the following claims.

We claim:

1. A gamma pulse suppression circuit for eliminating gamma induced noise from a detector signal, comprising:
    a high pass filter for separating high-frequency gamma induced pulses from the detector signal; and
    a gamma pulse detector for detecting the gamma induced pulses, the gamma pulse detector including a semiconductor barrier diode and a thin-base superconducting Josephson tunnel junction connected in series;
    wherein the gamma pulse suppression circuit is connected in parallel with a detector readout circuit such that the suppression circuit causes the readout circuit to discard samples of the detector signal in which gamma induced pulses are detected.

2. The gamma pulse suppression circuit as set forth in claim 1, wherein the gamma pulse detector operates in a current switching mode in which the thin-base Josephson junction is biased in the zero voltage state just below its critical current such that a gamma induced pulse causes the thin-base Josephson junction to jump from the zero voltage state into the voltage state.

3. The gamma pulse suppression circuit as set forth in claim 1, wherein the gamma pulse detector further includes a superconducting quantum interference device (SQUID) latch for operation in an amplification mode in which the thin-base Josephson junction is biased in the voltage state and the SQUID latch is biased in the zero voltage state just below its critical current such that a gamma induced pulse is amplified by the thin-base Josephson junction, causing the SQUID latch to jump from the zero voltage state into the voltage state.

4. The gamma pulse suppression circuit as set forth in claim 3, wherein the SQUID latch includes a pair of superconducting Josephson tunnel junctions connected in a superconducting loop, the thin-base Josephson junction being inductively coupled to the SQUID latch by an inductor coil and load.

5. A gamma pulse suppression circuit for eliminating gamma induced noise from a signal, comprising:
    detecting means for detecting gamma induced pulses in the signal based on frequency discrimination; and
    discarding means for discarding samples of the detector signal in which gamma induced pulses are detected;
    wherein the detecting means includes a high pass filter for separating high-frequency gamma induced pulses from the signal and a gamma pulse detector for detecting the gamma induced pulses, the high pass filter including a shunt capacitor and a semiconductor barrier diode connected in series; and wherein the gamma pulse detector includes the semiconductor barrier diode and a thin-base superconducting Josephson tunnel junction connected in series.

6. The gamma pulse suppression circuit as set forth in claim 5, wherein the gamma pulse detector operates in a current switching mode in which the thin-base Josephson junction is biased in the zero voltage state just below its critical current such that a gamma induced pulse causes the thin-base Josephson junction to jump from the zero voltage state into the voltage state.

7. The gamma pulse suppression circuit as set forth in claim 5, wherein the gamma pulse detector further includes a superconducting quantum interference device (SQUID) latch for operation in an amplification mode in which the thin-base Josephson junction is biased in the voltage state and the SQUID latch is biased in the zero voltage state just below its critical current such that a gamma induced pulse is amplified by the thin-base Josephson junction, causing the SQUID latch to jump from the zero voltage state into the voltage state.

8. The gamma pulse suppression circuit as set forth in claim 7, wherein the SQUID latch includes a pair of superconducting Josephson tunnel junctions connected in a superconducting loop, the thin-base Josephson junction being inductively coupled to the SQUID latch by an inductor coil and load.

* * * * *